United States Patent [19]
Vogt et al.

[11] Patent Number: 5,376,723
[45] Date of Patent: Dec. 27, 1994

[54] THERMOPLASTIC POLYURETHANE ELASTOMER BLEND AND PROCESS FOR ITS MANUFACTURE

[75] Inventors: Ulrike Vogt, Griesheim; Wolffried Werneis, Mannheim; Günter Schuhmacher, Weinheim, all of Germany

[73] Assignee: Firma Carl Freudenberg, Weinheim, Germany

[21] Appl. No.: 54,932

[22] Filed: Apr. 29, 1993

Related U.S. Application Data

[63] Continuation of Ser. No. 417,881, Oct. 6, 1989, abandoned.

[30] Foreign Application Priority Data

Oct. 7, 1988 [DE] Germany .............................. 3834103

[51] Int. Cl.⁵ ...................... C08L 33/20; C08L 75/04
[52] U.S. Cl. .................................. 525/126; 525/130; 525/131
[58] Field of Search ...................... 525/126, 130, 131

[56] References Cited

U.S. PATENT DOCUMENTS

| | | | |
|---|---|---|---|
| 3,678,129 | 7/1972 | Fischer | 525/125 |
| 4,143,092 | 3/1979 | Karmell | 525/128 |
| 4,374,192 | 2/1983 | Mayer et al. | 428/407 |
| 4,623,579 | 11/1986 | Quon | 428/215 |

FOREIGN PATENT DOCUMENTS 0012343  6/1980  European Pat. Off. ............ 525/130

Primary Examiner—James J. Seidleck
Assistant Examiner—Thomas Hamilton, III
Attorney, Agent, or Firm—Kenyon & Kenyon

[57] ABSTRACT

The subject invention is directed to a thermoplastic polymer blend of polyurethane and nitrile rubber having a Shore A hardness of about 55 to 70. The thermoplastic polyurethane component includes at least about 50 weight percent (wt. %) polyisocyanate; the nitrile rubber component includes about 34 mole percent (mol %) acrylonitrile; and, the ratio between the thermoplastic polyurethane component and the nitrile rubber component is about 30:70 to 40:60 volume percentage (vol %).

The invention also provides a process for making a thermoplastic polyurethane blend having a Shore A hardness of about 55 to 70; prepared by mixing and kneading about about 180° to 215° C., polyurethane component including at least about 50 percent by weight polyisocyanate with a nitrile rubber having a viscosity of $M_L$ 1+4,100° C.=50 and including about 34 mole percent (mol %) acrylonitrile in a ratio of polyurethane: nitrile rubber of about 30:70 to 40:60 percent by volume (% vol).

6 Claims, No Drawings

THERMOPLASTIC POLYURETHANE ELASTOMER BLEND AND PROCESS FOR ITS MANUFACTURE

This application is a continuation of application Ser. No. 07/417,881, filed on Oct. 6, 1989, now abandoned.

FIELD OF THE INVENTION

This invention relates to soft, thermoplastic polyurethane polymer blends having a Shore A hardness of about 55 to 70, made by blending specified polyurethane and nitrile rubber components.

BACKGROUND OF THE INVENTION

Vulcanized elastomers such as thermoset polyurethanes having a Shore A hardness in the 55 to 70 range have a disadvantage in that during their manufacture, a vulcanizing process must be performed which results in waste of substantial amounts of material. Furthermore, many application areas, for example, work boot, linings or tubes, require a rubber-like grip and/or extreme flexibility. Polyurethane elastomers with thermoplastic processability are especially useful in these fields.

Hardness levels of conventional polyurethane polymers may be adjusted to less than 70 Shore A by adding plasticizers. For example, commercially available 60 Shore A type polyurethane polymer may contain approximately 20% by weight dimethylglycol phthalate. In spite of good processability, a considerable disadvantage of the these plasticized polymers, e.g., with oils, lies in the fact that the plasticizer is extractable, that is the long-term stability of such products is very poor because the plasticizer may be lost by solvent extraction. Plasticizer volatization is also a problem especially when a plasticizer is stressed for a long period of time at high temperatures. Another technological disadvantage of plasticized polyurethanes lies in the fact that mixtures of polyurethane and plasticizer are often incompatible; in time, this also leads to exudation and volatilization of plasticizer over time from the polyurethane which results in considerable changes in the physical properties of the product.

An alternative for producing soft thermoplastic polyurethane lies in substantially reducing the polyisocyanate:polyol ratio, for example, to obtain a 60 Shore A product, this ratio should be fixed at less than about 30:100. Such a small proportion of isocyanate, however, may substantially reduce the tensile strength of the product. In addition, the fluidity of the product may be decreased to the extent that processibility is adversely affected, particularly in injection molding processes where decreased fluidity results in long cycle times and an undesirable sticking of the product to molds and other equipment. Moreover, such products often undergo a substantial shrinkage which, of course, causes problems in tool production and design.

OBJECTS AND SUMMARY OF THE INVENTION

An object of this invention is to provide a soft thermoplastic polyurethane blend having good processing characteristics and that retains many of the advantageous properties associated with conventional polyurethanes without added plasticizers.

Another object of this invention is to produce a thermoplastic processable polyurethane blend having a Shore A hardness in the range of about 55 to 70; that does not require any added plasticizer, and includes a sufficient amount of polyisocyanate, to provide reasonable injection molding cycle times and to avoid sticking. The thermoplastic polyurethane of this invention can be injected and effectively extruded and also provides a dimensionally stable extrudate immediately.

The present invention provides a soft thermoplastic polyurethane elastomer comprising a blend of a polyurethane component and a nitrile rubber component in a ratio of about 30:70 to about 40:60; said blend having a Shore A hardness of about 55 to 70; said polyurethane component including at least about 50 % wt. polyisocyanate; and said nitrile rubber component including about 34 mol % acrylonitrile. The blend of a polyurethane with a nitrile rubber may also include small amounts of conventional auxiliary agents such as, anti-ageing agents, fillers, cross-linking agents, pigments, accelerators and the like.

The present invention also provides a process for making a soft thermoplastic polyurethane elastomer blend having a Shore A hardness of about 55 to 70, comprising the steps of: mixing and kneading, at about 180° to 215° C., a polyurethane component (a) with a nitrile rubber component (b) in a ratio (a):(b) of about 30:70 to 40:60 on a vol % basis; said polyurethane component having a Shore A hardness of about 80 to 90 and a polyisocyanate content of at least about 50% wt.; and said nitrile rubber component having a viscosity of about $M_L$ 1+4, 100° C.=50 and an acrylonitrile content of about 34 mol %; and pelletizing the mixture.

The softness of the thermoplastic polyurethane elastomers produced by this invention is achieved without added plasticizers.

DETAILED DESCRIPTION OF THE INVENTION

The present invention provides soft thermoplastic polyurethanes having good processing characteristics while retaining many of the advantages of conventional polyurethanes by providing a blend wherein the polyurethane component is reduced by about 60 to 70 vol. % and replaced with a specified nitrile rubber.

The heat dimensional stability of the soft thermoplastic polyurethanes of this invention correspond to those of pure polyurethane and they are also resistant to hot oils and may be bonded to metal with conventional adhesive agents for polyurethanes.

The advantageous characteristics of the soft thermoplastic polyurethane blend of the invention are achieved, when the ratio of the polyurethane component to the nitrile rubber component amounts to about 30:70 to 40:60 vol. % and the polyurethane component has a polyisocyanate content of at least about 50 % wt. and the nitrile rubber component includes about 34 mole % acrylonitrile. Added plasticizers are not required to achieve the desired hardness. Preferably, the polyurethane component has a Shore A hardness of about 80 to 90, and the nitrile rubber component has a viscosity of about $M_L$ 1+4, 100° C.=50.

The processing steps of mixing, kneading, and pelletizing used in preparing the blend are conventional and not the subject matter of the present invention. The blend of this invention can be produced in conventional equipment, e.g., continuously in a reaction extruder or discontinuously in a rubber kneader.

The continuous process comprises the steps of premixing the polyurethane and nitrile rubber components and any optional auxiliary agents, such as, cross-linking agent and/or anti-ageing agent. The mixture is melted down in an extruder, kneaded and transported via a heated screw conveyor to a die with a granulating device. The granular material can be immediately processed further into a finished product using an injection molding or extrusion process.

In the discontinuous process, the nitrile rubber component is placed in a heated kneader and after plasticization, the polyurethane component is added. After kneading, the mixture is rolled, drawn out to a sheet, and cut into strips, which may be reduced to small pieces in a granulating device for further processing.

The following Examples further illustrate the production process and the product characteristics of the soft thermoplastic polyurethanes of the invention.

EXAMPLE 1

(Continuous Process)

Mix the following ingredients: 30 vol % polyurethane component (80 Shore A, 50% wt polyisocyanate components); 67 vol % nitrile-butadiene rubber component (34 molecular % acrylonitrile content; viscosity $M_L$ 1+4, 100° C.=50); and 3 vol % auxiliary additives, (pentaerythritol-tetrakis-(3-(3′,5′-di-ter.butyl-4′-hydroxyphenyl) propionate), 0.2 parts, and dilaurylthiodipropionate, 0.6 parts, respectively as anti-ageing agents; triallylcyanurate, 2.0 parts, as an accelerator; and 1.3-bis-(ter. butyl-peroxy-isopropyl)benzol, 1.0 parts, as a cross-linking agent.

The ingredients are first premixed in a tumbling mixer and subsequently fed in measured quantities into an extruder, where, within five minutes, the mixture passes through heated zones at about 180° to 215° C. and is thereby melted down and kneaded. The material is then transported via a screw conveyor, heated to over 205° C., to a die with a granulating device.

The granular material is injection molded into slabs, out of which test samples can be blanked to provide for a standard measurement, according to DIN regulations (German Industrial Standard) 53 505, DIN 53 504-A-S2 and DIN 53 517-A

| Product Characteristics | |
| --- | --- |
| Hardness | 60 Shore A (DIN 53 505) |
| Tensile Strength: | 10 MPa (DIN 53 504-A-S2) |
| Breaking elongation: | 450% (DIN 43 504-A-S2) |

Compression set, as a measure for the resetting capability (DIN 53 517-A):
24 h/23° C.: 15%
24 h/70° C.: 25%
24 h/100° C.: 45%

Also, torsional vibration diagrams according to DIN 53 455 demonstrated that the heat dimensional stability of the soft thermoplastic polyurethane elastomer produced in accordance with this Example corresponds well with that of the pure polyurethane.

EXAMPLE 2

A soft thermoplastic polyurethane elastomer was prepared substantially in accordance with Example 1, except that a polyurethane:nitrile-butadiene-rubber ratio of 35:62 by volume percentage was selected.

| Mechanical properties of the 35:62 elastomer: | |
| --- | --- |
| Hardness | 65 Shore A (DIN 53 505) |

| -continued | |
| --- | --- |
| Mechanical properties of the 35:62 elastomer: | |
| Tensile Strength: | 12 MPa (DIN 53 504-A-S2) |
| Breaking elongation: | 450% (DIN 43 504-A-S2) |

Compression set, (DIN 53 517-A):
24 h/23° C.: 15%
24 h/70° C.: 35%
24 h/100° C.: 55%

The hardness of the thermoplastic polyurethane elastomer according to the invention can thus be selectively adjusted by changing the polyurethane/rubber ratio.

A granular material according to Example 1 can, for example, be processed in an injection molding machine into suction caps for bottle grippers. The thickness of these approximately 5 cm high caps is typically about 1 to 2 mm. With the blend according to the invention, one attains fast injection molding cycle times of around 30 seconds.

It is possible to produce tube-shaped members with inner diameters of around 30 mm without vacuum-calibration with the thermoplastic polyurethane elastomers of the invention because the extrudate shape becomes inherently stable almost immediately after it is removed from the die.

Thermoplastic polyurethane-elastomers, which are formulated or produced according to the invention, have a high resistance to oil even after being stored for several days no significant swelling occurs. Moreover, since the need for plasticizers is totally eliminated, there is no oil contamination due to exuding plasticizers. In addition, by using conventional adhesive agents for polyurethanes, these thermoplastic polyurethane elastomer blends can be permanently bonded to metals, which substantiates their excellent suitability for rubber/metal elements, such as vibration dampers and elastic seals.

What is claimed is:

1. A thermoplastic polyurethane elastomer blend comprising at least about 30 to at most about 40 vol % of a polyurethane component and at least about 60 to at most about 70 vol % of a nitrile rubber component, said blend having a Shore A hardness of about 55 to 70 within added plasticizer; said polyurethane component including at least about 50 wt % polyisocyanate; said nitrile rubber component including about 34 mol % acrylonitrile.

2. The thermoplastic polyurethane elastomer blend recited in claim 1 wherein:
said polyurethane component has a Shore A hardness about 80 to 90, includes about 50% wt. polyisocyanate and comprises about 30 vol % of the blend;
said nitrile rubber component has a viscosity of $M_L$ 1+4,100° C.=50 and comprises about 67 vol % of the blend; and
further comprising about 3 vol % of an auxiliary agent, said auxiliary agent including at least one of an anti-ageing agent, an accelerator, and a cross-linking agent.

3. The thermoplastic polyurethane elastomer blend recited in claim 2, wherein:
said anti-ageing agents are pentaerythritol-tetrakis-(3-3′, 5′-di-t-butyl-4′-hydroxyphenyl)propionate, 0.6 parts; said accelerator is triallylcyanurate, 0.2 parts; and
said cross-linking agent is 1,3-bis-(t-butyl-peroxy-isopropyl) benzol, 1.0 part.

4. The thermoplastic polyurethane elastomer blend recited in claim 1 wherein:

said polyurethane component has a Shore A hardness of about 80 to 90, includes about 50% wt. polyisocyanate and comprises about 35 vol % of the blend;

said nitrile rubber component has a viscosity of $M_L1+4$, 100° C.=50 and comprises about 62 vol % of the blend; and further comprising about 3 vol % of an auxiliary agent, said auxiliary agent including at least one of an anti-ageing agent, an accelerator, and a cross-linking agent.

5. The thermoplastic polyurethane elastomer blend recited is claim 1 further comprising up to about 3 vol % auxiliary agents.

6. An injection molded article comprised of the thermoplastic polyurethane elastomer blend of claim 1.

* * * * *

UNITED STATES PATENT AND TRADEMARK OFFICE
CERTIFICATE OF CORRECTION

PATENT NO. : 5,376,723
DATED : Dec. 27, 1994
INVENTOR(S) : Vogt, et al.

It is certified that error appears in the above-indentified patent and that said Letters Patent is hereby corrected as shown below:

Column 4, line 45, "within" should be --without--;

Column 4, line 52, before "about" insert --of--;

Column 4, line 64, after "propionate" insert --), 0.2 parts and dialaurythiodipropionate,--.

Signed and Sealed this

Thirtieth Day of May, 1995

Attest:

BRUCE LEHMAN

*Attesting Officer*     *Commissioner of Patents and Trademarks*